United States Patent

Joy

[15] 3,648,647

[45] Mar. 14, 1972

[54] TOUCH SENSITIVE INDICATORS

[72] Inventor: Robert D. Joy, Cedar Rapids, Iowa

[73] Assignee: J-Tec Associates, Inc., Cedar Rapids, Iowa

[22] Filed: Aug. 14, 1970

[21] Appl. No.: 63,848

[52] U.S. Cl. .................................. 116/114 R, 35/39, 58/126
[51] Int. Cl. ..................................................... G01d 21/00
[58] Field of Search ........................... 35/35.1, 29 R, 139, 38;
58/126; 116/114

[56] References Cited

UNITED STATES PATENTS

| 2,078,982 | 5/1937 | Stark | 244/1 |
| 2,150,364 | 3/1939 | Dudley | 340/407 |
| 2,177,234 | 10/1939 | Walser | 35/39 X |
| 2,305,132 | 12/1942 | Bradford | 200/167 |
| 2,522,423 | 9/1950 | Youhouse | 200/167 |
| 2,581,207 | 1/1952 | Sambleson | 116/114 G |

Primary Examiner—Louis J. Capozi
Attorney—Griffin, Branigan and Kindness

[57] ABSTRACT

This disclosure describes touch sensitive indicators comprising a plurality of rods that are movable radially inwardly and outwardly with respect to a tubular housing. The lobe of a cam formed on the inner side of a knob impinges on the inner edges of the rods. The arcuate distance moved by the knob determines the number of rods that are moved from inner or inaccessable positions to outer or accessable positions. In this manner a touch sensitive indication of the arcuate distance moved by the knob is provided.

6 Claims, 5 Drawing Figures

Patented March 14, 1972
3,648,647
2 Sheets-Sheet 1
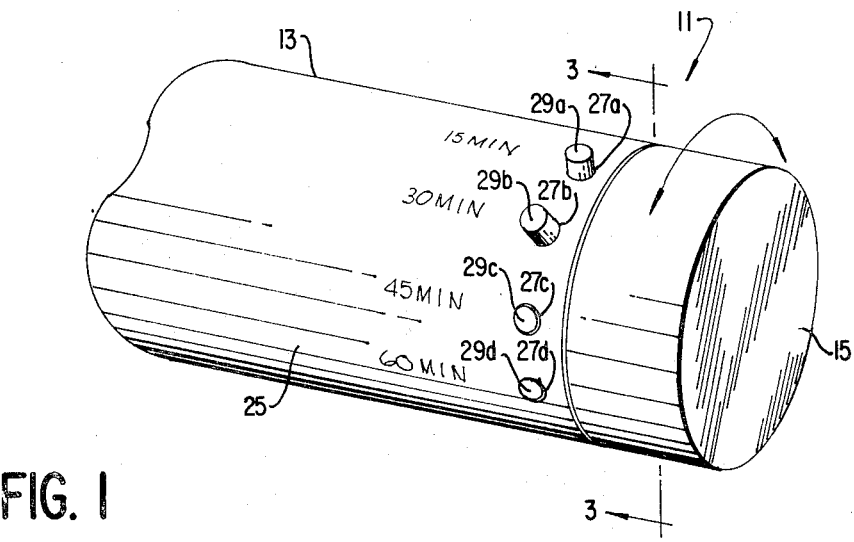
FIG. I
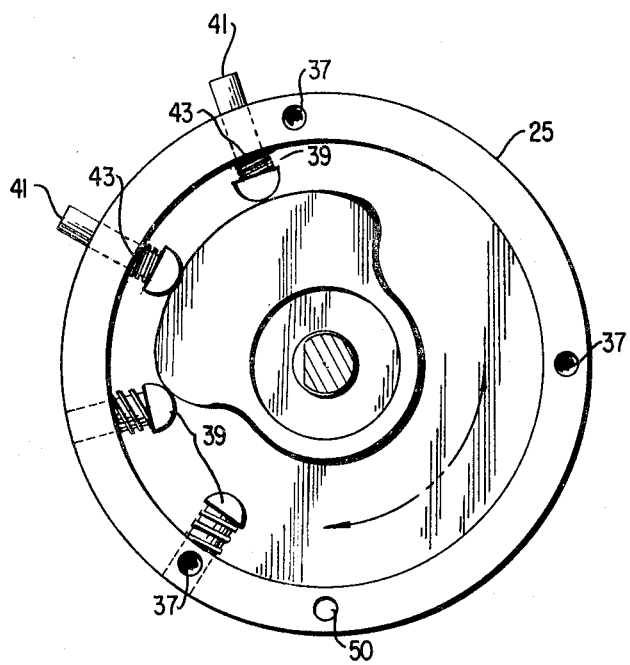
FIG. 3
INVENTOR
ROBERT D. JOY

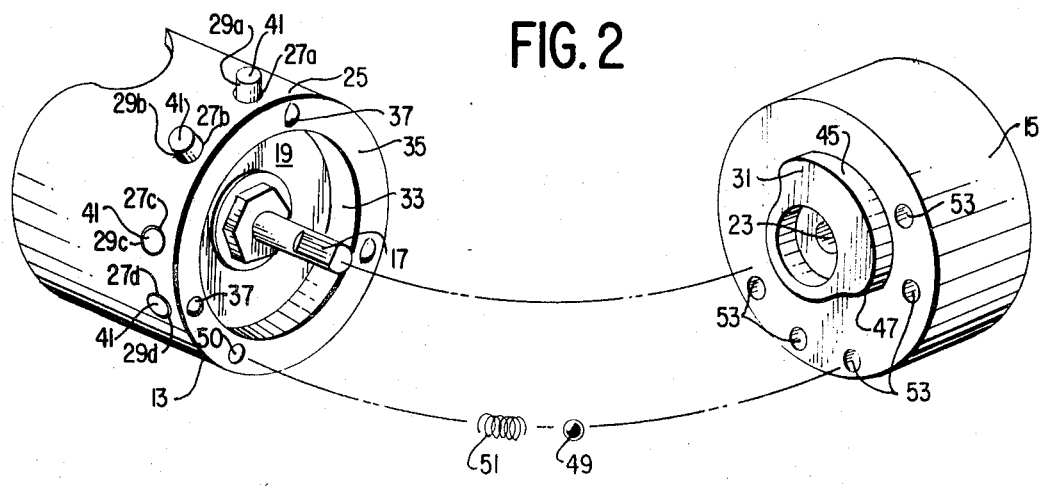
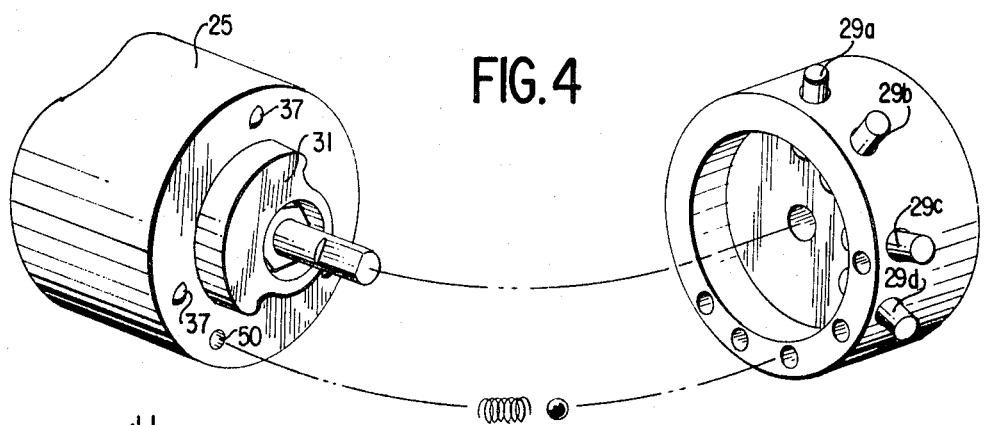
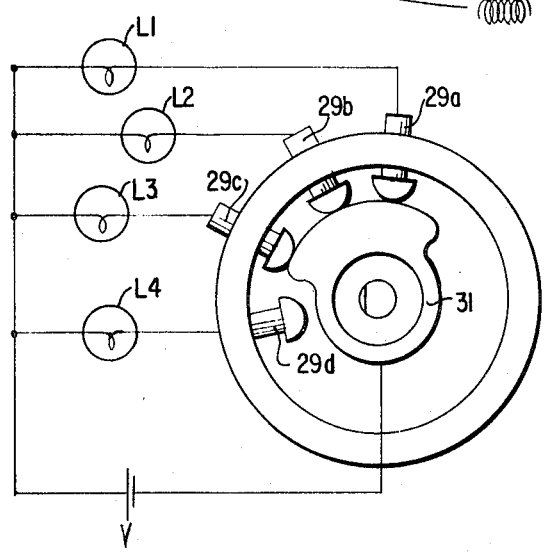

TOUCH SENSITIVE INDICATORS

BACKGROUND OF THE INVENTION

This invention generally relates to the art of indicators and more particularly to the art of touch sensitive indicators suitable for use in environments where visual indicators cannot be used.

Indicators are often used in environments where it is difficult or impossible for a user to visually read an indication. A few examples of such environments are: a diver working in water where visibility is essentially zero; a speed boat or racing car driver in a situation so dangerous that he dare not look at the indicator; a photographic developer working in an area where light is prohibited; and, a sailor setting a timer for a depth charge in the dark. In addition, the use of touch sensitive indicators is essential when the person "reading" the indications is blind. In other words, when circumstances or the environment make it difficult or impossible to see, indicators are often used that communicate by the sense of "touch."

While prior art touch sensitive indicators are suitable for use in many environments, in some environments in which touch sensitive indicators must be used, it is difficult to read them using the sense of touch. For example, deep sea divers often have trouble reading prior art touch sensitive indicators because the temperature of the water often numbs their fingers or because they are wearing heavy foam rubber gloves to keep their fingers warm. In addition, depth narcosis often impares their ability to think and calculate, thus making it even more difficult for them to read a touch sensitive indicator. It will be appreciated that, if deep sea divers are setting timers on under water mines, for example, it is essential that they be able to read the indicators forming a part of the timers quickly, easily and with a high degree of accuracy.

Therefore, it is an object of this invention to provide a touch sensitive indicator which can be read through relatively thick gloves or with cold fingers.

Many prior art touch sensitive indicators, particularly those used with underwater timers, employ the "lining up" principle. That is, each indicator has at least one movable protrusion and a linear array of stationary protrusions. The movable protrusion is movable to positions that align with the stationary protrusions and these indicators are touch read by feeling the relative position of the movable protrusion with respect to the linear array of stationary protrusions. An example of this general type of touch sensitive indicator is found in U.S. Pat. No. 2,277,234 to Walser. That patent discloses a touch readable time piece having protrusions positioned on indicating hands and at each number. Variations of this type of touch sensitive indicator have successively larger stationary protrusions, or successively larger groups of stationary protrusions to help users determine the relative position of the movable protrusions with respect to the linear arrays of stationary protrusions. Examples of such variations are described in U.S. Pat. No. 2,581,207 to Sambleson and U.S. Pat. No. 2,522,423 to Youhouse.

A major difficulty with prior art touch sensitive indicators is the use of an undue multiplicity of protrusions to form the stationary linear array which tends to confuse users because an undue number of mental steps are required to read them. That is, to read many prior art touch sensitive indicators the user must determine the particular position of a movable protrusions and then count the stationary protrusions that are related to that particular position. Determining which stationary protrusions he is to count and which stationary protrusions he is to ignore is difficult at best and almost impossible under some circumstances. For example, a diver suffering from depth narcosis may find it impossible to follow the mental steps necessary to read many prior art touch sensitive indicators.

Therefore it is another object of this invention to provide a touch sensitive indicator which can be easily read using relatively few mental steps.

It is also an object of this invention to provide a touch sensitive indicator that has a minimum number of protrusions.

It will be appreciated by those skilled in the art and others that while it is desirable to provide a touch sensitive that is easy to touch read, particularly in limited or zero visibility environments it is also desirable to provide a touch sensitive indicator that can be visually read if possible or desirable. For example, it is desirable that a touch sensitive indicator that is primarily intended for touch reading by blind users be also visually readable by non-blind users. Hence, it is a still further object of this invention to provide a touch sensitive indicator that is also visually readable.

SUMMARY OF THE INVENTION

In accordance with principles of this invention, touch readable indicators are provided. The indicators have touch sensitive elements which are selectively made accessible to be touched. The number (or lack thereof) of accessible touch sensitive elements is related to the particular reading being indicated.

In accordance with a further principle of this invention, the indicators employ indicating rods which are selectively extendable in a radial manner from a cylindrical housing. The number of extended indicating rods is related to the indicator's reading. An indicator cam that is rotatable inside of the housing to predetermined positions causes the extension of the rods.

In accordance with other principles of this invention, the cam is coupled to a timer mechanism so that as the cam is rotated the setting of the timer changes. Hence, the number of rod protrusions (or lack of rod protrusions) is related to the setting of the timer.

In accordance with still other principles of this invention means are provided for illuminating the rods in one or the other of their positions whereby a visual as well as a touch indication is provided.

BRIEF DESCRIPTION OF THE DRAWINGS

The foregoing and other objects, features and advantages of this invention will become more apparent from the following more particular description of preferred embodiments of the invention, as illustrated in the accompanying drawings in which referenced characters refer to the same parts throughout the different views. The drawings are not necessarily to scale, rather emphasis is placed upon illustrating the principles of the invention in a clear manner.

FIG. 1 is a perspective view of a timer assembly employing an indicator which utilizes the principles of this invention;

FIG. 2 is an exploded view of a part of the timer assembly shown in FIG. 1;

FIG. 3 is a cutaway view of FIG. 1 along the plane 3—3;

FIG. 4 is an exploded view of a modified embodiment of the invention; and

FIG. 5 is a schematic diagram of an indicator formed in accordance with the invention that provides a visual as well as a touch sensitive indication.

DESCRIPTION OF THE PREFERRED EMBODIMENTS

FIG. 1 illustrates one embodiment of the touch sensitive indicator of the invention 11 mounted on one end of a tubular shaped timer housing 13. A cylindrical shaped setting knob 15 is mounted on the same end of the timer housing and has a longitudinal flat sided bore 23 (FIG. 2) that fits over the flat sided end of a rotatable shaft 17. The shaft 17 extends into the timer housing in a longitudinal manner and controls the setting of a timer (not shown) housed in the timer housing 13. Thus, when the setting knob 15 is rotated relative to the timer housing 13, the shaft 17 rotates and sets the timer to a particular time period. The actual time period that is set depends upon the arcuate distance that the setting knob is rotated.

The end wall 19 of the timer housing 13 adjacent to the setting knob 15 holds a shaft bearing 21 through which the shaft 17 passes. The end wall 19 is recessed from the actual end of the timer housing 13 in order to provide a cavity 33 for the hereinafter described touch sensitive indicator.

The timer housing 25 contacts the setting knob at the outer edge 35 of the timer housing 13. Roller bearings 37 are inset in the outer edge of the timer housing to reduce friction between the outer edge and the setting knob 15.

One embodiment of a touch sensitive indicator suitable for use in the structure illustrated in FIG. 1 is illustrated in FIG. 2 and comprises: a plurality of indicator rods 29a–d; and an indicator cam 31. The indicator rods 29a–d project radially outwardly through rod holes 27a–d. The rod holes are located in a circumferential plane that cuts the cavity 33 formed in the end of the timer housing 13. Hence, the rods communicate between the cavity and the outer surface of the timer housing. The indicator cam 31 is flat and formed on or attached to the inner surface of the setting knob 15 so as to fit inside of the cavity 33. The indicator cam includes a lobe 45 that co-acts with the indicator rods in the manner hereinafter described, when the setting knob is rotated.

The indicator rods 29a–d have flanged inner ends 39 and smooth outer ends 41 (see FIG. 3). Preferably, the smooth outer ends 41 have a diameter of less than one-fourth inch and are separated from one another by at least three-eighths inch.

The indicator rods 29a–d respectively ride in the rod holes 27a–d with the flanged inner ends 39 being located inside of the cam cavity 33. A rod biasing spring 43 urges each indicating rod toward the center of the cam cavity 33 while a catch means (not shown) prevents the smooth outer end 41 from passing through the timer housing 25; thus, the smooth outer ends 41 are flush with the outer surface of the timer housing 25 when the indicator is not set. The flanged inner ends 39 are rounded to facilitate cooperation with the lobe 45 of the indicator cam 31, as explained below.

The lobe 45 of the indicator cam 31 has a wide side which is long enough to contact all of the indicator rods 29a–d at one time and a rounded contact area 47 for making initial contact with each of the indicator rods 29a–d as the cam is rotated when the setting knob is rotated.

In the illustrated embodiments of the invention, a "clicking" mechanism for maintaining the setting knob 15 at predetermined positions is included. The "clicking" mechanism illustrated in FIG. 2 comprises a ball cam 49 and a ball cam spring 51 inset into any aperture 50 in the outer edge 35 of the timer housing 13. A series of recesses 53, located at predetermined positions on an inner face of the setting knob 15, cooperate with the ball cam 49. As the setting knob 15 is rotated, the ball cam 49 "drops" into each recess 53 in succession. The ball cam spring 51 causes the dropping action, thus, the setting knob 15 tends to stop at and stay at the predetermined positions.

In operation, prior to setting the setting knob 15, the indicator cam 31 is not in contact with any of the indicator rods 29 a–d and the rod biasing springs 43 hold the indicator rods 29 a–d inwardly so that their smooth outer ends 41 are flush with the outer surface of the timer housing 13. The fact that there are no indicator rods extending beyond the outer surface of the timer housing, indicates to a user that the time is set to measure a zero time period. As the setting knob 15 is turned in a counter clockwise direction relative to the timer housing 25, the rotatable shaft 17 is also turned and the timer mechanism is thereby set to measure a predetermined time period. Also, as the setting knob 15 is turned, the indicator cam 31 is turned inside the cam cavity 33. As the indicator cam is turned, its contact area 47 contacts a first indicator rod 29a and pushes it outwardly so that it extends beyond the outer surface of the timer housing 25. At this point the timer mechanism is set to measure a predetermined incremental time period such as 15 minutes, for example. It will be appreciated by those skilled in the art and others that a user, even if he is wearing relatively heavy gloves, can easily feel that only one indicator rod 29a is extending beyond the outer surface of the timer housing and thereby will realize that the timer is set to measure the aforesaid 15-minute time period.

As the setting knob 15 is turned further, the timer mechanism will be set to measure a greater time period (for example, 30 minutes) and the contact area 47 of the indicator cam 31 will force a second indicator rod 29b outwardly. The first indicator rod is also held in an outward attitude by the lobe 45 of the indicator cam 31. The user can now feel two indicator rods extending beyond the outer surface of the timer housing 25 and thereby will realize that the timer is set to measure the 30-minute period. The indicator cam is shown in this position in FIGS. 1–3. Similarly, the setting knob 15 can be rotated until three or all of the indicator rods 29 a–d are extended and the timer mechanism will be set to measure greater time periods, such as 45 minutes or 1 hour, for example.

It will be appreciated by those skilled in the art that reading an indicator employing the principles of this invention requires only the mental step of counting the number of extended protrusions. This is clearly an improvement over prior art indicators which require a user to ascertain which series of protrusions are aligned with a movable protrusions and then count the series of protrusions. Moreover, the outer housing of a touch sensitive indicator employing the principles of this invention is relatively streamlined when the indicator is not in use; thus, it is easier to handle and more pleasing in appearance. Further, as previously stated the extending indicator rods of this invention can easily be counted through foam rubber gloves of the type normally used by divers.

While for streamlining purposes it is preferred that the rods start from a flush position and protrude from the structure as the setting knob is rotated, this arrangement can be reversed, if desired. That is, if desired, the rods could start from a protruding position and more inwardly as the cam is rotated. Hence, it is the change in position of a predetermined number of rods that provides the touch sensitive indication, not the actual starting and ending position of the rods, even though starting with a flush position is preferred.

FIG. 4 illustrates an alternative embodiment of the above described touch sensitive indicator. The embodiment illustrated in FIG. 4 differs from the embodiment illustrated in FIGS. 1–3 in that the indicator cam 31 is located on the end wall 19 of the timer housing 13, rather than on the setting knob 15, and, the indicating rods 29 a–d are mounted in the setting knob 15, rather than in the timer housing 25. Thus, in the FIG. 4 embodiment the roles of the setting knob 15 and the timer housing 25 have been reversed. Otherwise, the FIG. 4 embodiment functions similarly to the functioning of the embodiment illustrated in FIGS. 1–3, hence, it will not be further described here except to state that, using the foregoing exemplary time periods, the indicator shown in FIG. 4 is set to measure a 60-minute time period rather than a 30-minute interval because all of the indicator rods 29 a–d are extended.

While it is preferred to use the touch sensitive indicator as such, it will be appreciated that in some environments, it may be desirable to provide a visual as well as a touch sensitive indication, or at least to provide the option of having a visual indication. An electrical schematic diagram of such an indicator is illustrated in FIG. 5. And, in addition to the mechanical elements previously described includes: a voltage source designated V; and, four lamps designated L1, L2, L3 and L4. One side of V is connected to one side of all of the lamps L1–L4. The other side of V is connected to the cam 31 and the other sides of L1, L2, L3 and L4 are connected to the rods 29a, 29b, 29c and 29d, respectively.

In operation, as the cam is rotated, it comes in contact with 29a–29d in sequence. This sequential contacting causes sequential lighting of L1–L4 until all of the lamps are lit. It will be appreciated by those skilled in the art and others that the cam and the rods could be made of a current conducting metal or could be made of plastic or a similar material and have electrical contacts on their contacting surfaces. It will also be appreciated that a switch could be included between the lamps and the voltage source to disengage the lamps in certain environments, such as when the indicator is to be used in a darkroom, for example.

While the invention has been particularly shown and described with reference to preferred embodiments, it will be understood by those skilled in the art that changes in form and detail can be made therein without departing from the spirit and scope of the invention. For example, the indicating rods 29 a–d could be made of a light-transmitting material such as lucite and have the lamps (L1-L4) located within the housing so that the indicating rods light up as they change position. Or, a single lamp could be used with the cam acting as a shield to only emit light after a change of position has occurred. Similarly, different colored indicating rods could be used to indicate different paramenters. In addition, the indicating rods 29 a–d could be mounted in a flat housing and cooperate with a linear motion cam rather than with a rotational motion cam. Hence, the invention can be practiced otherwise than as specifically described herein.

It should be noted that while the invention has been generally described in a timer, environment, that it can also be used in many other environments. For example, it can be used with a multiposition switch to provide a touch sensitive indication of the setting of the switch.

The embodiments of the invention in which an exclusive property or privilege is claimed are defined as follows:

1. A touch sensitive indicator for indicating a relative condition by the sense of touch comprising:
   a tubular housing having a cavity in one end and a plurality of holes that extend radially outwardly from said cavity;
   a shaft mounted in said housing and extending outwardly from said cavity along an axis that is generally coaxial with the longitudinal axis of said tubular housing;
   a plurality of touch sensitive rods suitable for communicating information by the sense of touch, said plurality of touch sensitive rods being mounted in said plurality of holes that extend radially outwardly from said cavity in said tubular housing;
   a plurality of coil springs, one of said coil springs engaging each of said plurality of touch sensitive rods in a manner that forces said touch sensitive rods toward the center of said cavity;
   a setting knob attached to said shaft, said setting knob being rotatable with respect to said tubular housing about an axis that is generally coaxial with the longitudinal axis of said tubular housing; and,
   a radial cam fixedly attached to said setting knob so as to lie within said cavity, said radial cam having a lobe adapted to coact with the inner ends of said plurality of touch sensitive rods so as to selectively move each of said touch sensitive rods so as to selectively move each of said touch sensitive rods between a first position where said touch sensitive rods are inaccessible to be touched and a second position where said touch sensitive rods are accessible to be touched, the number of said touch sensitive rods lying in one of said positions being related to said relative condition.

2. A touch sensitive indicator as claimed in claim 1 including a spring loaded detent positioning means located between said housing and said knob for maintaining said knob in predetermined positions.

3. A touch sensitive indicator as claimed in claim 2 including visible indicating means coupled to said plurality of rods for indicating which of said plurality of rods are in said first position and which of said plurality of rods are in said second position.

4. A touch sensitive indicator for indicating a relative condition by the sense of touch comprising:
   a tubular housing having a radial cam fixedly attached to one end thereof, said radial cam having a lobe;
   a shaft mounted in said housing and extending outwardly beyond said radial cam along an axis that is generally coaxial with the longitudinal axis of said tubular housing;
   a setting knob having a cavity in one end and a plurality of holes that extend radially outwardly from said cavity, said setting knob being mounted on said shaft so that said cavity encompasses said radial cam;
   a plurality of touch sensitive rods suitable for communicating information by the sense of touch, said plurality of touch sensitive rods being mounted in said plurality of holes that extend radially outwardly from said cavity in said setting knob, said plurality of touch sensitive rods being located such that the lobe of said radial cam coacts with the inner ends of said plurality of touch sensitive rods so as to selectively move each of said touch sensitive rods between a first position where said touch sensitive rods are inaccessible to be touched and a second position where said touch sensitive rods are accessible to be touched, the number of said touch sensitive rods in one of said positions being related to said relative condition; and,
   a plurality of coil springs, one of said coil springs engaging each of said plurality of touch sensitive rods in a manner that forces said touch sensitive rods toward the center of said cavity.

5. A touch sensitive indicator as claimed in claim 4 including a spring loaded detent positioning means located between said housing and said knob for maintaining said knob in predetermined positions.

6. A touch sensitive indicator as claimed in claim 5 including visible indicating means coupled to said plurality of rods for indicating which of said plurality of rods for indicating which of said plurality of rods are in said first position and which of said plurality of rods are in said second position.

* * * * *